Figures 1, 2:
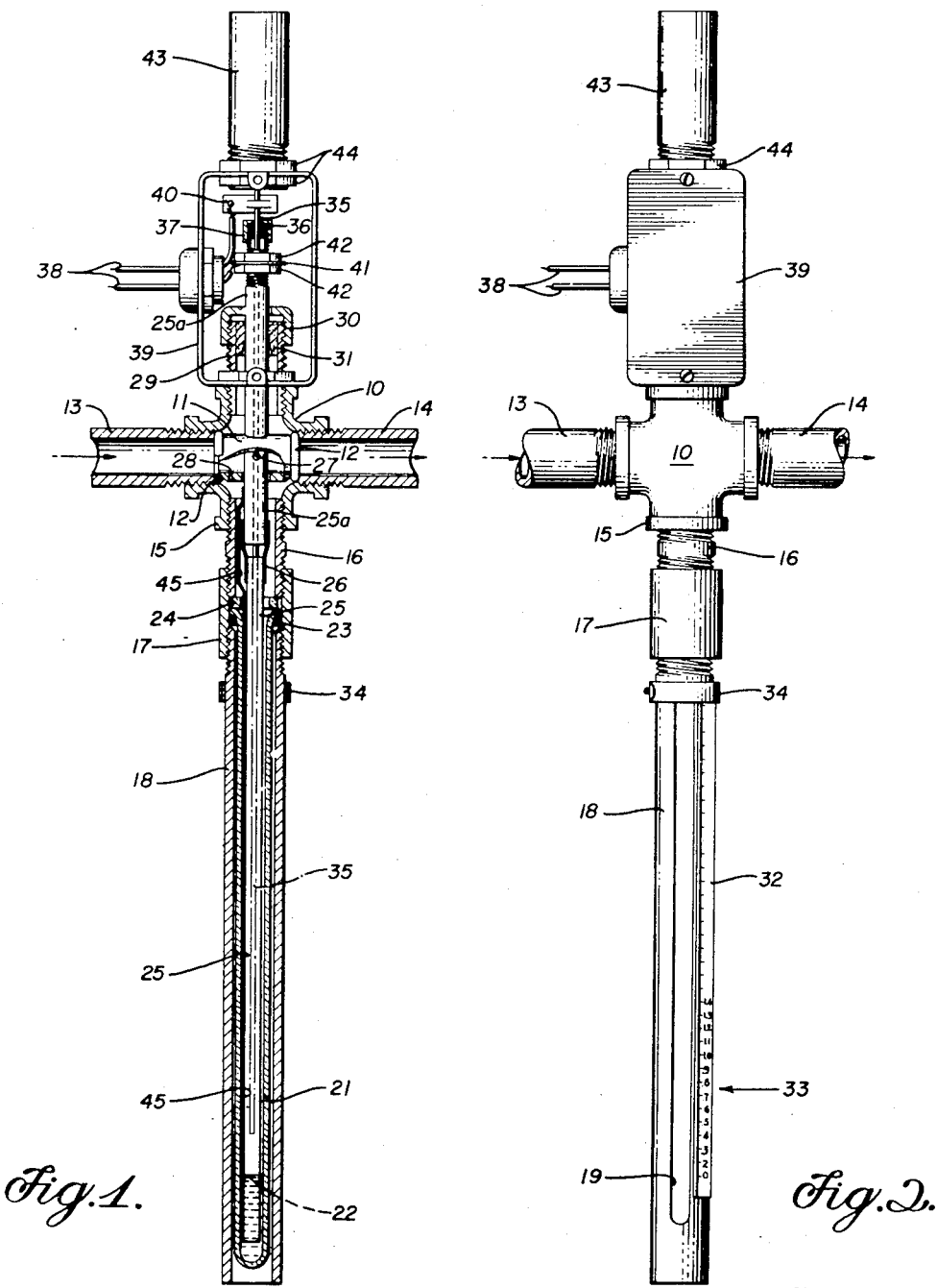

Nov. 20, 1956  R. S. CANNELL  2,770,969
FLUID FLOW METER AND CONTROLLER
Filed April 29, 1955

INVENTOR.
ROGERS S. CANNELL
BY
ATTORNEY.

United States Patent Office 2,770,969
Patented Nov. 20, 1956

2,770,969

FLUID FLOW METER AND CONTROLLER

Rogers S. Cannell, Palo Alto, Calif., assignor, by mesne assignments, to United States of America as represented by the United States Atomic Energy Commission Application April 29, 1955, Serial No. 505,073

5 Claims. (Cl. 73—211)

This invention relates to fluid flow meters for the metering of gases and liquids and, more particularly, to such a meter as will give also a visual indication of the fluid flow therein.

It is a principal object of the invention to provide a meter of the type described that is easily and cheaply fabricated of standard pipe fittings.

Another object of the invention is to provide a fluid flow meter having relatively few parts and characterized by trouble-free service over considerable periods of time.

A further object of the invention is to provide a meter that will give an indication of differential pressure and serve also as an upper or lower flow limit controller when used with an electrically actuated valve.

Other objects and advantages of the invention will be apparent from the following description of a preferred embodiment of the invention, and to the accompanying drawing wherein Figure 1 is a vertical, partially sectional view of a preferred embodiment of the invention and Figure 2 is a vertical elevation thereof.

The advantages of pressure differential flow meters are well known in the art; their use, however, has not been as extensive as such advantages warrant due chiefly to their high cost. My discovery that a simple straight tube bridged across opposite horizontal arms of a standard "cross" pipe fitting, with a smaller vertical tube intersecting the bridging or bore tube and communicating therewith by a transversely bored hole forming opposed ports at the center line of the bore tube, will act essentially as a Venturi throat, if connected to a suitable mercury manometer, makes possible the low cost, differential flow meter of this invention.

Reference is now made to the drawing in which it will be seen that a standard pipe fitting, known commonly as a cross 10 and which may vary from ¾" to 2" inner bore, as desired, is the central element of the preferred structure. Within the bore of the cross 10 defined by the oppositely extending horizontal arms is disposed a hollow cylindrical bore tube 11, symmetrically disposed within said horizontal bore and maintained in such position by suitable resilient O rings 12. The fixed positioning of bore tube 11 is further assured by the engagement of the threaded end of inlet conduit 13 into one of the horizontal arms of cross 10 and the similar end of outlet conduit 14 into the opposite arm of said cross. The bottom arm 15 of cross 10 receives in threaded relation a pipe nipple 16 while the lower end of the latter is threaded into pipe coupling 17. The latter serves to encase in serial relationship essential components of the flow meter and visual manometer, the outermost component being an elongated tubular casing 18, which is threaded at its upper end into the lower end of coupling 17 and extends for a substantial distance therebelow. Tubular casing 18 is vertically slotted at 19 for a substantial distance to provide visual inspection of the casing interior and for a purpose later to be described. Disposed within casing 18 and spaced a short distance preferably from the inner wall thereof is a vertically elongated gauge tube 21 closed at its lower end to retain a suitable level of mercury 22 and flared outwardly at its open upper end to seat upon a suitable resilient O ring 23 surrounded by coupling 17 and adapted to be compressed to suitable sealing configuration by engagement of the upper threaded end of casing 18 projecting into coupling 17. Resting upon the upper end of gauge tube 21 is a spacer ring 24 centrally apertured to allow the projection of a cylindrical glass tube 25 loosely therethrough, the latter extending down into gauge tube 21 to a point short of the bottom of the latter. It will be seen from Fig. 1 that the mercury 22 at the lower end of gauge tube 21 is free to rise to various levels within glass tube 25 depending upon the relative pressures exerted on the upper surface of the mercury within glass tube 25 and that within gauge tube 21 but exterior of tube 25. The manner in which such differential pressure is produced and serves as an indication of fluid flow will later be described hereinafter.

The upper end of vertical glass tube 25 is joined to an axially aligned upper extension 25a of electrically conducting material and having slightly greater diameter by a suitable resilient sleeve 26. Extension tube 25a passes through vertically aligned apertures of increased diameter formed in bore tube 11, is itself provided with small apertures 27 located at the intersection of the horizontal axis of cross 10 with a vertical axis of extension 25a to allow fluid to pass from the exterior of extension 25a to the interior thereof through such apertures. Facilitating passage of fluid from the interior of bore tube 11 to the bottom arm 15 of the cross is a small aperture 28 disposed to one side of the central bore tube aperture through which extension 25a extends.

Surmounting the upper arm of cross 10 and threaded thereinto is a suitable pipe nipple 29 capped by a suitable closure 30 which is centrally bored to allow the passage without contact of extension 25a, the latter being surrounded by a suitable sealing ring 31 of flexible material to provide an inner seal against the wall of extension 25a and outer seal against the bore of pipe nipple 29.

It will be seen from the foregoing that there has been provided a differential flow meter in which the pressure of the fluid entering inlet conduit 13 will exceed that leaving outlet conduit 14 and the indication of rate of flow being ascertainable from the level of mercury within vertical tube 25. The foregoing result is due, of course, to the particular arrangement of passages 27 and 28 together with the relative pressure utilization of which appears on the mercury level within tube 25 in response to the fluid pressure exerted on the upper surface of the mercury within gauge tube 21 but external to tube 25. To further facilitate the reading of the mercury level referred to, slot 19, earlier mentioned, has been provided. A suitable linear gauge strip 32 bearing markings generally indicated at 33 may be disposed adjacent slot 19 and there maintained by a suitable clamp 34 surrounding casing 18.

Not only does the variable level of mercury serve as a visual indication of the differential pressure metered by this invention, but the provision of simple and inexpensive auxiliary equipment may also provide an upper or lower flow limit controller when used with an electrically actuating valve controlled by a contact cooperating with the mercury in the manometer section of the unit. To this end it is preferred to provide an electrically conducting path from extension 25a to the lowermost level of the mercury 22, such means in the present embodiment being a suitable elonagted wire or metallic member 45 contacting extension 25a spaced from sleeve 26, extending through spacer ring 24 and thence downwardly between the inner wall of tube 21 and the outer wall of glass tube 25. The electrical circuit may be completed by extending a wire 35 of iron or stainless steel axially of tube 25 through extension 25a and through the upper end of the later from which it is electrically insulated by a suitable insulating plug or bushing 36 retained in place by a centrally apertured cap 37. A pair of electrical leads 38 may be brought out through a suitable knockout opening in standard receptacle box 39, which desirably encloses the upper electrical connections of the meter, as shown in Fig. 1, one of such leads 38 being connected to wire 35 by a spring clip 40 and the other lead being connected to extension 25a through connector ring 41 secured by lock nuts 42. In addition to the conventional closure plate with which receptacle box 39 is provided, vertical access to such box may be provided by closed pipe nipple 43 secured in the customary vertical knockout opening of box 39 by lock nuts 44. Thus it will be observed that the fluid flow to conduit 13 may be regulated as desired by means of a solenoid operated valve connected to leads 38 and responsive to either an upper or lower level of the mercury.

Since the exit flow through the meter bears a known relationship to inlet pressure for a meter of given dimensions, flow in gallons per minute can be plotted directly against inches of mercury and the latter provides a visual indication thereof of such flow.

From the foregoing it will be seen that there has been provided a fluid flow meter of simple and economical construction and further characterized by a minimum of critical components as to either assembly, adjustment or maintenance.

It is to be understood that the invention is not limited by the exact embodiments shown, which are merely by way of illustration and not limitation, as various and other forms of the device will, of course, be apparent to those skilled in the art without departure from the spirit of the invention or the scope of the claims.

What is claimed is:

1. In combination with a cross type pipe fitting, a bore tube bridging opposed inlet and outlet horizontal arms of said fitting, a vertical pressure tube extending transversely through said bore tube to form a flow restriction therein, first port means disposed in said pressure tube transverse to said bore tube at said flow restriction, second port means disposed in said bore tube adjacent said inlet arm and communicating with the lower arm of said fitting, a closed end tubular means extending downwardly from said lower arm of said fitting, and an opened end tubular means extending downwardly from said pressure tube in coaxial relation with said closed end tubular means with a conducting liquid partially filling both tubular means to form a manometer for indicating pressure differentials between said bore tube and said pressure tube.

2. A combination according to claim 1 in which said manometer containing said conducting liquid is further characterized with the addition of electrical contact means extending through said pressure tube and tubular means to contact said liquid at a predetermined level thereof.

3. A fluid flow meter comprising a cross type pipe fitting, a bore tube bridging opposed inlet and outlet horizontal arms of said fitting, a vertical pressure tube extending transversely through said bore tube to form a flow restriction therein, first port means disposed in said pressure tube transverse to said bore tube at said flow restriction, second port means disposed in said bore tube adjacent said inlet arm and communicating with the lower arm of said fitting, a closed end tubular means extending downwardly from said lower arm of said fitting, and an opened end tubular means extending downwardly from said pressure tube in coaxial relation with said closed end tubular means with a conducting liquid partially filling both of said tubular means to form a manometer for indicating pressure differentials between said bore tube and said pressure tube, first electrical contact means extending through said pressure tube and open ended tubular means to contact said liquid at a predetermined level thereof and second electrical contact means extending through said closed end tubular means, both of said contact means terminating externally of said fitting for energization of remotely located fluid flow means.

4. A combination according to claim 3 in which both of said tubular means are of transparent material for facilitating the visual inspection of the liquid level therein.

5. A combination according to claim 3 in which both of said tubular means are of transparent material for facilitating the visual inspection of the liquid level therein and a vertically extending liquid level indicator mounted on the exterior wall of said manometer for indicating directly said liquid level.

References Cited in the file of this patent

UNITED STATES PATENTS 2,536,089  Ratchford et al.   Jan. 2, 1951

FOREIGN PATENTS 11,214  Germany   Oct. 14, 1880